United States Patent [19]
Eriksson

[11] Patent Number: 5,956,652
[45] Date of Patent: Sep. 21, 1999

[54] SYSTEM AND METHOD RELATING TO CELLULAR COMMUNICATIONS

[75] Inventor: Dick Eriksson, Haninge, Sweden

[73] Assignee: Telefonaktiebolaget LM Ericsson, Stockholm, Sweden

[21] Appl. No.: 08/786,552

[22] Filed: Jan. 21, 1997

Related U.S. Application Data

[63] Continuation of application No. 08/366,471, Dec. 30, 1994.

[51] Int. Cl.$^6$ .................................................. H04Q 7/20
[52] U.S. Cl. .......................... 455/555; 455/422; 455/524; 455/554
[58] Field of Search ..................... 455/422, 426, 455/432, 433, 436, 446, 524, 554, 555, 560, 561; 370/522, 524

[56] References Cited

U.S. PATENT DOCUMENTS

| | | | |
|---|---|---|---|
| 4,748,655 | 5/1988 | Thrower et al. | 379/60 |
| 4,843,622 | 6/1989 | Yotsutani et al. | 455/555 |
| 4,890,315 | 12/1989 | Bendixen et al. | 455/554 |
| 5,243,641 | 9/1993 | Evans et al. | 455/555 |
| 5,440,613 | 8/1995 | Fuentes | 455/555 |
| 5,442,684 | 8/1995 | Hashimoto et al. | 455/555 |
| 5,479,483 | 12/1995 | Furuya et al. | 455/555 |
| 5,799,250 | 8/1998 | Veloso et al. | 455/554 |

FOREIGN PATENT DOCUMENTS

| | | |
|---|---|---|
| WOA931162 | 6/1993 | WIPO . |
| 9405126 | 3/1994 | WIPO . |
| WOA94/0512 | 3/1994 | WIPO . |
| WOA940512 | 3/1994 | WIPO . |
| 9416531 | 7/1994 | WIPO . |
| 9426073 | 11/1994 | WIPO . |
| WOA94/2607 | 11/1994 | WIPO . |

OTHER PUBLICATIONS

Harry Newton, "Newton's Telecom Dictionary" pp. 771–772, Nov. 1994.

*Primary Examiner*—Dwayne D. Bost
*Assistant Examiner*—Nay A. Maung
*Attorney, Agent, or Firm*—Burns, Doane, Swecker & Mathis, L.L.P.

[57] ABSTRACT

An arrangement providing access between a mobile communications network and a private network with at least one exchange or private branch exchange. Mobility serving devices are connected to the exchange or the private branch exchange over a first interface providing access to/from mobile cellular phones and over a second interface for calls to/from personal number users. A cellular telephone of the mobile cellular network connects to the exchange over an interface.

16 Claims, 3 Drawing Sheets

SYSTEM AND METHOD RELATING TO CELLULAR COMMUNICATIONS

This application is a continuation of application Ser. No. 08/366,471, filed Dec. 30, 1994.

BACKGROUND

The present invention relates to a system and a method for providing cellular mobility within a telecommunications system comprising a single exchange, e.g. a Private Branch Exchange or a private telecommunications Network Exchange or a private network with a number of exchanges.

The invention further relates to an arrangement for providing a mobile cellular telephone with access to an exchange and particularly to the services provided by the exchange substantially in the same way as a cordless telephone within radio coverage of a radio exchange adjunct to the exchange. The invention also relates to mobile telecommunications system comprising a cellular communication system and a private network wherein cellular access is provided to the private network and to the services offered thereby.

In a system known today a cordless user who is within radio coverage of a radio exchange which is adjunct to a private branch exchange has access to the services offered by the private branch exchange. If however the user is not within radio coverage of a radio switch adjunct to the private branch exchange, a cellular phone has to be used. With the cellular phone it is however not possible to access the services offered by the private branch exchange other than those provided to an ordinary analogue telephone or a so called POTS phone (plain old telephone service) over the public network.

A number of attempts have been done to provide access to both cellular communication networks and private networks or to interconnect the networks. Through using combined telephones, i.e. a cellular telephone and a cordless telephone in one which comprises double equipments of transceivers, antennas etc. with which it is possible to change between a cellular network and the private network. In other systems a user is required to have two different telephones one for the cellular network and one for the private network. None of the systems provide cellular access to the private network or to the services provided by a PBX or a private network. A combined telephone as referred to above is quite a complicated device and there is also no cellular access provided to the services offered by the private network.

In another system illustrated in EP-A-462 727 a mobile communications network is illustrated comprising a PCN-network and a private automatic branch exchange (PABX) connected thereto. Calls which involve mobile subscribers associated with the PABX are routed via a base station controller comprising a mobile services switching center functionality of the PCN-network. A private protocol of the PABX is used. This requires that there are specific protocols in the PABX which means that it is not possible to use the exchange as it is but it has to be modified. Moreover, it is not possible through this arrangement to get access to all services provided by the private branch exchange or the private network and for example the same telephone number can not be used but an additional numbering plan has to be used for this particular category of users.

Also with this known system it is not possible for a cellular phone to get access to all the services provided by a PBX or a private network and particularly it is not possible to use the same numbering plan irrespective of whether using a cellular or a cordless phone.

SUMMARY

It is an object of the present invention to provide an arrangement through which cellular phone access to an exchange or to a private network is provided. An exchange may in this application relate e.g. to a Private Telecommunications Network Exchange PTNX. The European Telecommunications Standard Institute defines this as "A PTN nodal entity that provides automatic switching and call handling functions used for the provision of the telecommunication services. A nodal entity consists of one or more nodes. The nodal entity, performing the functions outlined above, can be implemented by equipment located on the premises of the private network administrator or by equipment co-located with, or physically part of a public network". Two implementations of PTNX are: PBX, An implementation of a private telecommunications network exchange located on the premises of a private network administrator. Centrex, An implementation of a private telecommunications network exchange not located on the premises of a private network administrator. The invention is in the following mainly described in relation to a PBX, but it likwise applies to a centrex or e.g. any kind of a PTNX, as well as any other relevant exchange. PBX also comprises Private Automatic Branch Exchanges PABX. Thus even if referring to a PBX in this document, the invention as explained above is not limited thereto but also covers other exchanges. More particularly it is an object of the invention to provide an arrangement through which a cellular user gets access to the services provided by an exchange or a private network. It is also an object of the present invention to provide an arrangement and a method respectively through which a cellular user gets a fast access to a private network or to e.g. a private branch exchange and to provide a cellular user with access to most of the extension services provided by the PBX (PTNX) and the private network. Another object with the invention is to provide an arrangement which is easy to use and which has a good security.

It is also an object of the invention to provide a communications system comprising a cellular network and a private network wherein cellular telephones easily can access the private network and particularly the services as provided by the private network and wherein a cellular user can access the private network particularly without requiring any networking support from the (private branch) exchange or without imposing requirements on the (private branch) exchange itself.

It is also an object with the invention to provide access to a mobile cellular telephone by an internal private branch exchange party or by an external party via the private branch exchange. These as well as other objects are achieved through connecting a mobility serving means on an interface to an exchange and connecting a cellular system to the mobility serving means directly or over the exchange e.g. a PBX.

The exchange and the mobility serving means may particularly be interconnected over two interfaces of which a first is intended for access to/from mobile cellular telephones and a second is intended for calls to/from personal number users. The personal number is an extension number in e.g. the PBX assigned to a user of a mobile cellular phone. The cellular system is connected to the private branch exchange over an interface with DTMF (Dual Tone Multiple Frequencies) transmission.

Alternatively the cellular network is directly connected to the mobility serving means over an interface thus bypassing the exchange.

Applicants copending U.S. patent application "System and method relating to cordless communications" filed on Dec. 30, 1994, relates to provision of cordless phone access to a PBX (PTNX) or to a private network and to provision of cordless mobility and it is incorporated herein by reference.

The mobility serving means is then arranged between an exchange and a number of radio exchanges interfacing the exchange using the existing interface from the exchange and the mobility serving means can be said to emulate a radio exchange in interworking with the exchange. Since the interface from the exchange is unchanged, no modification as to the software or the hardware of the exchange is required by the mobility serving means (or mobility server (MOBS)).

According to the invention the mobile cellular phone in general appears as an extension to the exchange which means that if the user of the mobile cellular phone makes a call within the private numbering plan of the private network, a connection to the (private branch) exchange will automatically be established.

It is an advantage with the invention that a cellular phone can access the services provided by a private network in an easy way without imposing any further requirements on private branch exchanges and that a fast access to the private branch exchange can be provided. Another advantage with the invention is that the same exchange (PBX) extension number can be used irrespective of whether a cordless telephone or a cellular telephone is used. Further advantages will be evident from the more detailed description of the invention.

BRIEF DESCRIPTION OF THE DRAWINGS

The invention will in the following be further described in a non-limiting way under reference to the accompanying drawings wherein.

DETAILED DESCRIPTION

Figure 1:
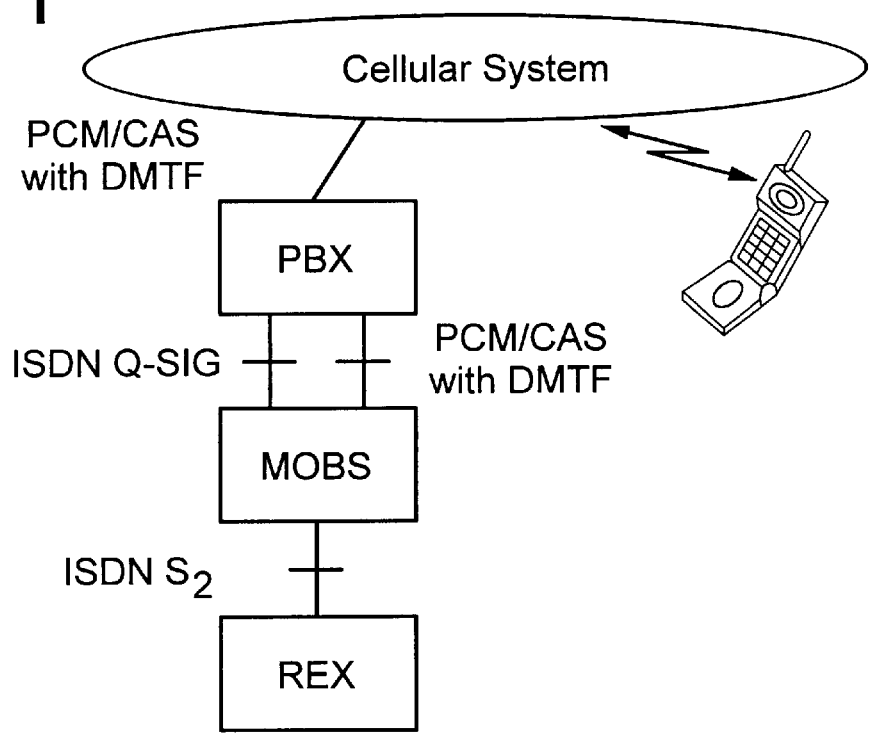
FIG. 1 illustrates a first embodiment of the invention wherein mobility serving means are connected to a cellular network via a private branch exchange.

In FIG. 1 a first embodiment of the invention is illustrated comprising a cellular network (for example GSM, ADC, (D-)AMPS etc) to which a private branch exchange PBX is connected. The PBX is connected to a mobile switching center (not shown in the figures) of the cellular network over a dedicated trunk route supporting a protocol with DTMF (Dual Tone Multiple Frequency) transmission of A-numbers (the identity of the calling party). The interface between the PBX and the mobile switching center of the cellular network is in the illustrated embodiment the PCM/CAS interface with DTMF digit transmission. PCM (Pulse Code Modulation) is a common transmission technique worldwide. ITU (formerly CCITT) has issued a number of recommendations for this technique. CAS (Common Channel Signalling) indicates that all bearer channels share one signalling channel for line signalling information. The CCITT recommendations in series G.700–G.795 describe general aspects of digital transmission systems. In particular the following CCITT recommendations apply to PCM and CAS as to be applied in the described application; G.703 "Physical/electrical characteristics of hierarchical digital interfaces", G.704 "Synchronous frame structures used at primary and secondary hierarchical levels", G.711 "Pulse code modulation of voice frequencies", G.731 "Primary PCM multiplex equipment for voice frequencies", G.732 "Characteristics of primary PCM multiplex equipment operating at 2.048 Mbps", G.733 "Characteristics of primary PCM multiplex equipment operating at 1.544 Mbps" and Q.512 "Exchange interfaces for subscriber access". The PBX may e.g. also be connected to wired extensions, operators, the public switched telephone network PSTN and it may also comprise connections e.g. for providing messaging, interceptions services etc.

The private branch exchange can for example be the MD110 by Ericsson and in different embodiments the interconnecting interface can for example be the trunk protocols by Telia P7 which requires additional in-band DTMF after answer, or P8' comprising direct-in-dialling with A-number transfer. Of course these are only examples of protocols relevant to the European GSM market, corresponding signal protocols exist for other markets and other protocols relating to other systems etc. Thus a number of other protocols can of course also be used. Signalling cases relevant to the two above mentioned trunk protocols will be illustrated later on in relation to FIGS. 5 and 6.

The PBX is further connected to a mobility server MOSS which in turn can be connected to a number of cordless radio exchanges REX of which only one can be illustrated here for reasons of clarity. The radio exchange REX is connected to the mobility server MOBS over the ISDN $S_2$-interface supporting mobility management. The MOBS is then connected to the PBX on the existing interface between the PBX and the REX which e.g. can be ISDN $S_2$, PCM/CAS or an analogue extension. However, for the purpose of the present invention it is irrelevant whether the radio exchanges (REX) are present or not. In the relation to the ISDN $S_2$, the S reference point is adopted in PBX systems as the access interface for extension lines. The $S_2$ indicates a 2 Mbps primary rate interface (30B+D). Similarly an $S_1$ interface indicates a 1.5 Mbps primary rate interface (23B+D) used mainly in the USA. The primary rate interface and its D-channel control signalling allows traffic concentration, i.e. more than 30 or 23 users can be allocated to one interface ($S_2$ or $S_1$ respectively). In this particular case it is the PCM/CAS with DTMF signalling. Since the existing interface to the PBX is used, the PBX does not have to be changed which means that no modification as to the PBX software or to the PBX hardware is required and in interworking with the PBX the MOBS emulates a radio exchange. The PCM/CAS interface (the second interface) is used for calls to/from personal number users. Instead of PCM/CAS e.g. the ISDN $S_2$ or an analogue extension line may be used. However, the MOBS is also connected to the PBX over a first interface providing access to/from mobile cellular users. In this case it is the ISDN Q-SIG interface. Q-SIG is an ISDN network protocol set for private networks specified by ETSI. The following ETSI standards apply to basic call and form a basis for supplementary services: ETS 300 170, "Data link layer protocol at the Q reference point for the signalling channel between two private telecommunication network exchanges", ETS 300 172, "Layer 3 protocol for signalling between exchanges of private telecommunication networks for control of circuit switched calls", ETS 300 329, "Generic fuctional protocol for the support of supplementary services". The following draft ETSI standards apply to cordless mobility in private networks: QSIG-CTAU, "Cordless terminal authentication", QSIG-CTLR, "Cordless terminal location registration", QSIG-CTMI, "Incoming CTM call handling", QSIG-CTMO, "Outgoing CTM call handling". The copending U.S. patent Application "Arrangement and method relating to cordless communications" which is incorporated herein by a reference among others discusses a number of private networks comprising a number of private branch exchanges connected to mobility servers which are so interconnected as to form an overlay network of mobility servers which provide for transparent access signalling between them and from cordless telephones to PBXs etc. The present invention of course also relates to any form of the private network wherein the mobility servers are interconnected forming an overlay network even if this is not explicitly illustrated in any figures here; the principle of providing cellular access to the PBX is the same whether it just relates to one PBX interconnected with one mobility server or whether a number of PBXs are arranged so as to form a network either by themself assisted by an overlay network formed by the mobility servers or standalone PBXs wherein a number of mobility servers are interconnected so as to form a network.

Figure 2:
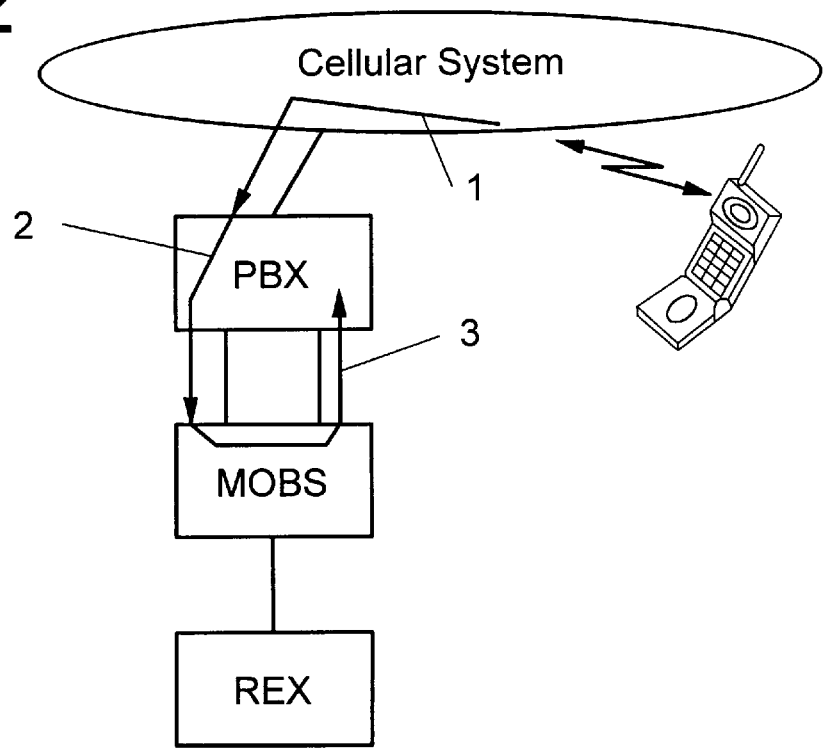
FIG. 2 illustrates a mobile cellular telephone accessing a private branch exchange.

FIG. 2 relates to a first embodiment of providing a cellular telephone with access to a PBX. The private network comprises a private numbering plan. When the user of the cellular telephone makes a call within the private numbering plan the cellular network sets up a connection to the trunk route to the PBX and transmits the A-number. Examples on interfaces are discussed in relation to FIG. 1. The PBX makes for the call coming in on the trunk route a transit call to the MOBS across the ISDN Q-SIG tie-line route and transmits the A-number that was received by it from the cellular network. The MOBS then analyzes the called number from the PBX and establishes that the call is of such kind that it is to be routed to PBX and that it is to be treated as a call from the personal number which is associated to the received A-number. Relating to a different embodiments the A-number received from the PBX is converted or not by the MOBS before the PBX is called by the MOBS. Thus it may be a call from the personal number being the same as the regional A-number or it may be a call from a translated A-number.

According to an advantageous embodiment a PIN-code is transmitted by the cellular network which is to be verified by the mobility server. This provides a good security and it is e.g. required for the P7 trunk protocol which will be further discussed later on, since the A-number is part of the string of key-pad digits. Additional digits (B-number keyed by the cellular phone user) will be transmitted to the PBX. If no additional digits are received, then the dialtone from the PBX is through connected to the cellular network.

Figure 3:
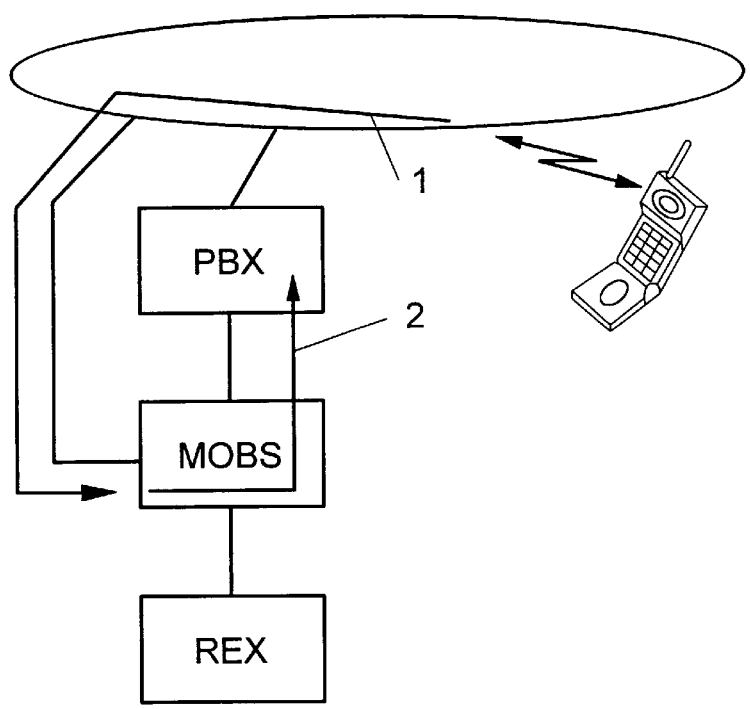
FIG. 3 illustrates a second embodiment of the invention wherein a cellular network and mobility serving means a directly interconnected.

According to another embodiment of the present invention which is schematically illustrated in FIG. 3 the cellular network is directly connected to the MOBS instead of indirectly connected to the MOBS via the PBX. Thus, if a cellular user makes a call within the private numbering plan the cellular network sets up a connection to the trunk route to the MOBS and transmits the A-number. The MOBS examines the called number and determines that the call is to be routed to the PBX and that it is to be treated as a call from the personal number identical to the received A-number. As in the foregoing embodiment the received A-number may be converted or not by the mobility server before calling the PBX.

In both the embodiments discussed above, when the cellular user makes a call within a private numbering plan he will be automatically connected to the PBX and the cellular phone will appear as an extension to the PBX. Since the cellular phone appears as an attention to the PBX, it will be represented in the PBX with a directory number, class of service, a number of features and a line status etc. The PBX will provide the same functions to the cellular user as to a cordless user which is in radio coverage of a radio exchange adjunct to the PBX in a manner known per se. The cellular user will substantially get access to all services provided by the PBX of which here a few examples are given such as extension initiated services, e.g. enquiry, transfer, diversion services, busy line services for incoming calls such as call back etc. Operator services such as call accounting services and other private network services such as least cost routing etc. can also be provided to the cellular user as well as to a roaming cordless user in the same way as if it was question about a cordless user within radio coverage of a radio switch adjunct to the PBX.

Figure 4:
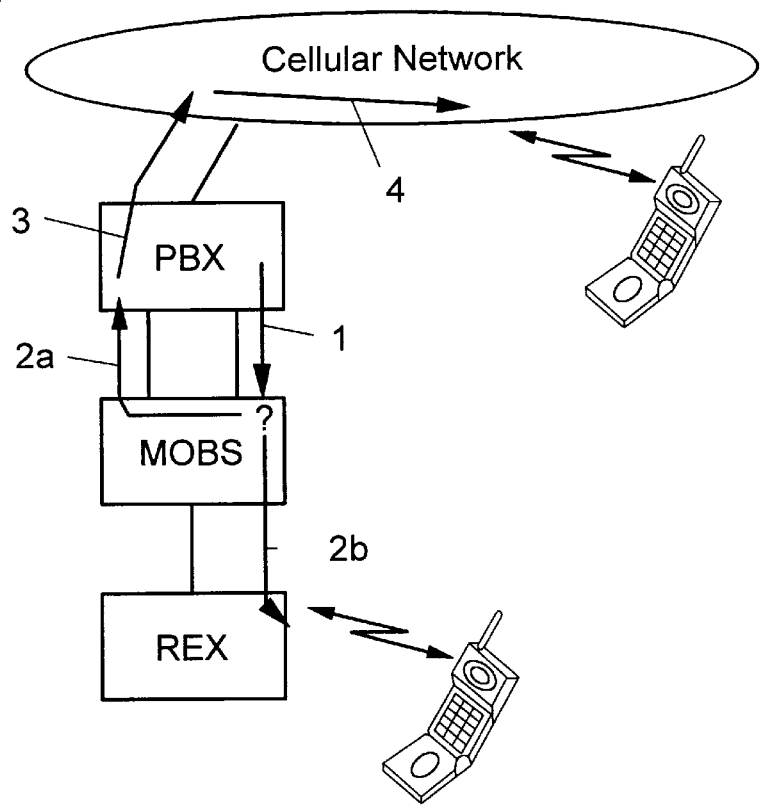
FIG. 4 illustrates a call to a mobile cellular telephone.

FIG. 4 illustrates a call to a mobile cellular telephone, e.g. a GSM portable. A personal number can be called from an internal party of the PBX, e.g. a desk phone, an operator or another personal number, or from an external party through the PBX, e.g. a PSTN phone or a cellular phone. In the Fig the interwork between the systems is illustrated. The PBX will call the mobility server over a PCM-channel assigned to this personal number and thus the mobility server can identify the called number (step 1). Two different phones can be associated with the personal number: A cellular phone in the GSM network (in this particular embodiment) and a cordless phone. The mobility server will, based on the personal profile of the personal number and the status of the phones (available or not available), route the call to the cellular phone or to the cordless phone (step 2a and 2b respectively in FIG. 4). When the call is to be routed towards the cellular phone the following actions are taken: Step 2a, indicated by the arrow 2a: The personal number is converted to the public cellular number by the mobility server and additional access codes may also be added by the mobility server for the required routing through the PBX. The call is then routed to the PBX over the ISDN Q-SIG interface.

Step 3 as indicated by arrow 3: The PBX will handle the incoming calls as a normal transit call and there is no additional requirement on the PBX for this traffic case.

Step 4 as indicated by arrow 4: The mobile switching centre of the GSM network will handle the incoming call as a normal call to a GSM number. There is no additional requirement on the GSM network for this traffic case.

Figure 5:
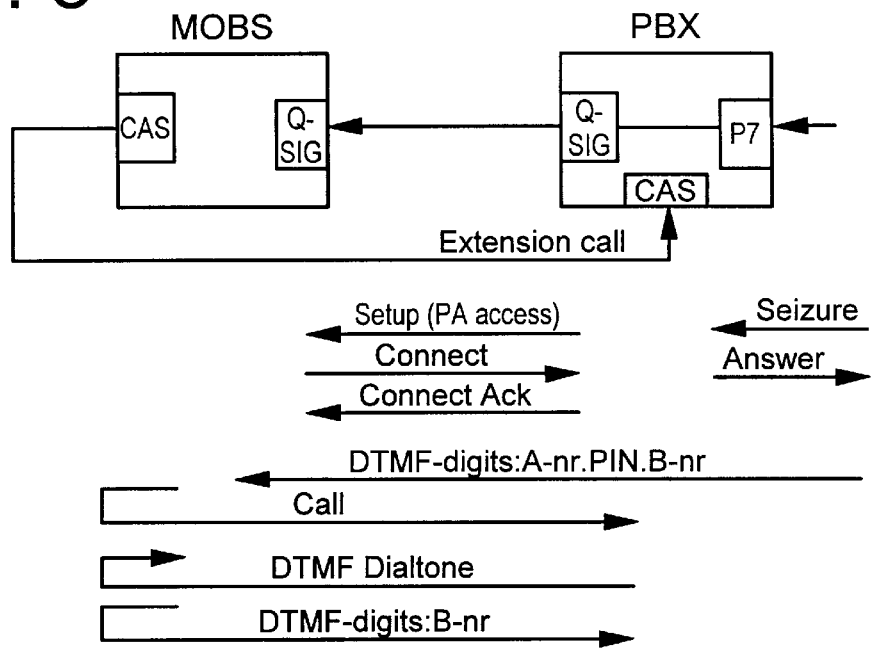
FIG. 5 illustrates a signal diagram of a call from a mobile switching center with one example of a trunk protocol and, FIG. 6 illustrates a signal diagram for a call from a mobile switching center with a second example of a trunk protocol.

Under reference to FIG. 5 a first signalling case will be illustrated for a first trunk protocol by Telia requiring additional in-band DTMF after answer, the P7 protocol. In the signal diagrams of FIGS. 5 and 6, signal arrows represent line signals or ISDN D-channel messages except for the bold arrows which represent voice band DTMF digits or tones.

In relation to FIG. 5, the P7 protocol is an example of a simple line signalling protocol used by Telia, a Swedish operator of both wired (PSTN) and wireless networks (cellular). The protocol is applied over PCM/CAS between the mobile switching center and the PBX. In this example two line signals are used for call set-up from the mobile switching center to the PBX: Seizure and Answer. The line signals are using the CAS signal bits a and b. Address information is transmitted by DTMF tones in the voice band between the mobile switching center and the PBX. The address information comprises:

A-number, i.e. the identity of the calling party. This information is not dialled by the user, but is sent by the network itself after identification of the calling party.

B-number. This is the address dialled by the calling party. optionally according to an advantageous embodiment a PIN-code (Personal Identification Number) can be transmitted by the network in order to enhance the fraud protection level.

When the PBX receives the Seizure signal from the cellular network the PBX calls the mobility server over the ISDN Q-SIG interface. The mobility server will then set up a speech connection to a DTMF tone receiver and order the PBX to enter speech state by sending the Connect signal. The PBX will acknowledge the Connect signal by returning Connect Ack and the PBX will through-connect the PBX to the mobility server and also sends the Answer signal over CAS to the mobile switching center. The mobile switching center in turn through-connects the connection and then transmit the address information by DTMF tones to the mobility server.

The mobility server analyzes the received A-number and may optionally validate the PIN-code. The A-number is translated by the mobility server to a personal number, which in turn is associated with a PCM time slot on the extension access line to the PBX. The mobility server then calls the PBX over the access line and the chosen time slot. The incoming call to the PBX from the mobility server is handled as an ordinary call from an extension by the PBX, i.e. a DTMF tone receiver is connected and a dialtone is sent over the time slot to the mobility server. When the mobility server detects dialtone from the PBX over the access line, then the B-party number is transmitted as DTMF digits to the PBX over the same access line.

The mobility server then through-connects the call so that the calling party (cellular user) is now transparently connected to the PBX and will receive in-band progress tones such as ring tone or busy tone as any extension of the PBX would. Post-dialling procedures are now possible by end-to-end DTMF if supported by the GSM portable, e.g. a request for intrusion or call-waiting if the called party is busy.

Figure 6:
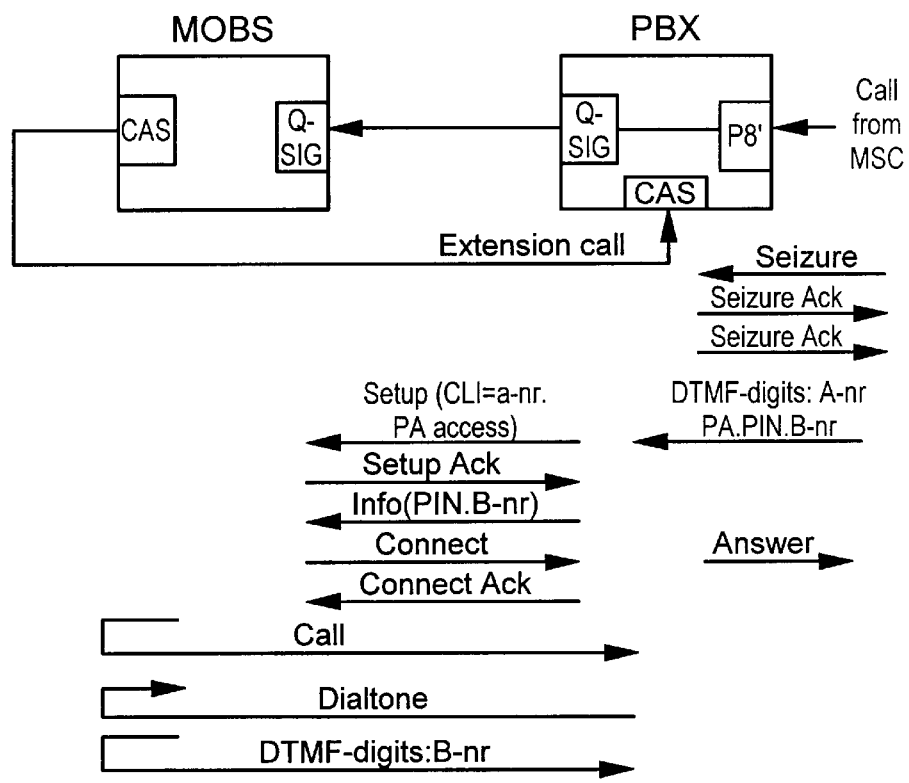

A second signalling case is illustrated in FIG. 6 and in this case, the P8' protocol, the network signalling protocol provides both the A-number and the B-number as part of the call set up sequence. There is no need for inband DTMF transmission of the A-number after answer.

The invention is of course not limited to the shown embodiments but can be varied in a number of ways within the scope of the claims.

What is claimed is:

1. A telecommunications system comprising a cellular mobile communications network and a private network including at least one private branch exchange in which access is provided between the cellular communications network and the private network, and mobility serving means connected to the cellular mobile communications network over at least one interface providing access to/from mobile cellular telephones, wherein the mobility serving means is connected directly to a private branch exchange over a second interface for calls to/from personal numbers users and the second interface has the form of an extension access interface; the private branch exchange being connected to the cellular mobile communications network on a dedicated trunk route supporting DTMF signalling.

2. The telecommunications system of claim 1, wherein the cellular network is connected indirectly to the mobility serving means; and the at least one interface comprises a first interface interconnecting the private branch exchange with the mobility serving means, which first interface provides access to/from mobile cellular telephones, and a second interface connecting the cellular mobile communications network with the private branch exchange.

3. The telecommunications system of claim 2, wherein the private branch exchange is connected to a mobile switching center of the cellular mobile communications network.

4. The telecommunications system of claim 3, wherein the private branch exchange is connected to the mobile switching center over a dedicated trunk route supporting DTMF signalling.

5. The telecommunications system of claim 4, wherein the dedicated trunk route provides DTMF transmission of an A-party number.

6. The telecommunications system of claim 2, wherein the first interface is an ISDN Q-SIG interface.

7. The telecommunications system of claim 2, wherein the second interface is one of a PCM/CAS interface, an ISDN $S_2$ interface, and an analog extension line.

8. The telecommunications system of claim 2, wherein the mobility serving means is further connected to a number of radio exchanges via an ISDN $S_2$-interface in order to also provide cordless mobility.

9. The telecommunications system of claim 1, wherein the cellular mobile communications network is connected directly to the mobility serving means via an interface supporting DTMF signalling with transmission of an A-number.

10. A mobile communication system comprising a mobile cellular communication network and a private network including a number of private branch exchanges and mobility serving means, each private branch exchange being directly connected via an interface to mobility serving means, wherein the cellular communication network directly interfaces the mobility serving means in order to provide cellular telephone access to the private network so that, when a call is made within a private numbering plan by a mobile cellular user, a connection is automatically established with the private branch exchange wherein the connection at least includes an extension access interface.

11. A method for providing a cellular telephone of a cellular mobile communications network with access to a private network having at least one private branch exchange when a call is made within a private numbering plan of the private network by automatically connecting the cellular telephone to the private branch exchange, comprising the steps of:

setting up a connection with the cellular mobile communications network to a trunk route to the private branch exchange;

transmitting an A-number;

making a transit call from the private branch exchange to mobility serving means connected to the private branch exchange over a first interface with the A-number;

analyzing a call number in the mobility server, examining if the call is to be routed to the private branch exchange, and then routing the call to the private branch exchange over a second interface that directly connects the mobility serving means to the private branch exchange the mobility serving means using the transmitted A-number when calling the private branch exchange; and treating the call as a call from a personal number identical to the A-number.

12. The method of claim 11, wherein the mobility serving means uses the A-number when calling the private branch exchange.

13. The method of claim 11, wherein the A-number is converted in the mobility serving means before the mobility serving means calls the PBX.

14. A method for connecting a user of a private branch exchange to a mobile cellular telephone, wherein the mobile cellular telephone is associated with a personal number, comprising the steps of:

from the private branch exchange, calling a mobility serving means connected directly thereto over a second extension access interface assigned to the personal number in order to identify the call number;

in the mobility serving means, converting the personal number to a public cellular number;

routing the call to the private branch exchange over a first interface;

in the private branch exchange, handling the call as an ordinary transit call;

from the private branch exchange, calling a mobile switching center of a cellular network via an interface supporting DTMF signalling with transmission of an A-number, wherein the mobile switch center handles the call as an ordinary call to the mobile cellular telephone.

15. The method of claim 14, wherein a user of the private branch exchange is an internal party of the private branch exchange.

16. The method of claim 14, wherein a user of the private branch exchange is an external party calling through the private branch exchange.

* * * * *